(12) United States Patent
Nandan et al.

(10) Patent No.: US 12,262,061 B2
(45) Date of Patent: Mar. 25, 2025

(54) OPTIMIZED EDGE ORDER FOR DE-BLOCKING FILTER

(71) Applicant: Texas Instruments Incorporated, Dallas, TX (US)

(72) Inventors: Niraj Nandan, Bengaluru (IN); Mullangi Venkata Ratna Reddy, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 80 days.

(21) Appl. No.: 18/219,788

(22) Filed: Jul. 10, 2023

(65) Prior Publication Data
US 2023/0353789 A1 Nov. 2, 2023

Related U.S. Application Data

(63) Continuation of application No. 17/523,541, filed on Nov. 10, 2021, now Pat. No. 11,700,396, which is a continuation of application No. 16/838,132, filed on Apr. 2, 2020, now Pat. No. 11,202,102, which is a continuation of application No. 15/871,713, filed on Jan. 15, 2018, now Pat. No. 10,652,582, which is a continuation of application No. 14/278,697, filed on May 15, 2014, now Pat. No. 9,872,044.

(30) Foreign Application Priority Data

May 15, 2013 (IN) .......................... 2133/CHE/2013

(51) Int. Cl.
*H04N 19/80* (2014.01)
*H04N 19/423* (2014.01)
*H04N 19/86* (2014.01)

(52) U.S. Cl.
CPC .......... *H04N 19/80* (2014.11); *H04N 19/423* (2014.11); *H04N 19/86* (2014.11)

(58) Field of Classification Search
CPC ....... H04N 19/80; H04N 19/423; H04N 19/86
USPC .................................................. 375/240.29
See application file for complete search history.

(56) References Cited

U.S. PATENT DOCUMENTS

| | | |
|---|---|---|
| 8,483,268 B1 | 7/2013 | Alvarez et al. |
| 2006/0133504 A1 | 6/2006 | Jung et al. |
| 2008/0123750 A1* | 5/2008 | Bronstein ............ H04N 19/436 375/240.24 |
| 2010/0014597 A1 | 1/2010 | Gao |

(Continued)

*Primary Examiner* — Jae N Noh
(74) *Attorney, Agent, or Firm* — Carl G. Peterson; Frank D. Cimino

(57) ABSTRACT

A de-blocking filter includes a reconstructed memory that is configured to store reconstructed pixels corresponding to a current macroblock of a video image to be filtered. The current macroblock includes a set of sub-blocks, each sub-block having horizontal edges and vertical edges. An internal pixel buffer in the de-blocking filter is configured to store pixels corresponding to the set of sub-blocks from the reconstructed memory, and to store partially filtered pixels corresponding to a set of partially filtered macroblocks. An edge order controller in the de-blocking filter is configured to load the pixels corresponding to the set of sub-blocks into a filter engine from the internal pixel buffer, to filter the set of sub-blocks, such that, at least one horizontal edge is filtered before filtering all vertical edges of the set of sub-blocks.

20 Claims, 6 Drawing Sheets

(56) References Cited

U.S. PATENT DOCUMENTS

2013/0114690 A1 5/2013 Chono et al.
2013/0223532 A1 8/2013 Xi et al.
2014/0056363 A1 2/2014 He
2016/0295158 A1* 10/2016 Van Belle ................. G06T 5/20

* cited by examiner

OPTIMIZED EDGE ORDER FOR DE-BLOCKING FILTER

CROSS REFERENCES TO RELATED APPLICATIONS

This application is a continuation of U.S. patent application Ser. No. 16/838,132 filed Apr. 2, 2020, which is a continuation of U.S. patent application Ser. No. 15/871,713, filed Jan. 15, 2018, now U.S. Pat. No. 10,652,582, which is a continuation of U.S. patent application Ser. No. 14/278,697, filed May 15, 2014, which is now U.S. Pat. No. 9,872,044, which claims priority from Indian patent application No. 2133/CHE/2013 filed on May 15, 2013, all of which are hereby incorporated by reference in their entirety.

TECHNICAL FIELD

Embodiments of the disclosure relate to de-blocking filter in a video processor.

BACKGROUND

Transformation and quantization in block based video codecs introduces blocking artifacts at edges. Special optimized video filter called de-blocking filter is conditionally applied on 4×4/8×8 pixel block boundary to enhance visual quality and improve prediction efficiency. Most of the recent video codecs such as H.264, H.265 (HEVC), and VC-1 uses in-loop de-blocking filter in the decoder path. Each video codec standard defines fixed order of filter operation to have consistency in universal decoder output.

Standard defined fixed edge order is not optimal for various architectures of de-blocking filter hardware accelerator (HWA), as it will have to compromise on performance, power or area. In-loop de-blocking filter integrated in video processing engine running at macroblock (MB) level pipeline is challenging in handling MB boundary level pixels. Concurrent operation of loading and storing of unfiltered, partially filtered and fully filtered pixels in and out of the internal storage along with the filter operation are some of the challenges that are difficult to meet with standard defined edge order for filter operation without getting impacted due to stall from shared memory access.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a de-blocking filter in a video processor. The de-blocking filter includes a reconstructed memory that is configured to store reconstructed pixels corresponding to a current macroblock of a video image to be filtered. The current macroblock includes a set of sub-blocks, each sub-block having horizontal edges and vertical edges having a left vertical edge, a right vertical edge, a top horizontal edge and a bottom horizontal edge. The de-blocking filter further includes an internal pixel buffer configured to store pixels corresponding to the set of sub-blocks from the reconstructed memory, and to store partially filtered pixels corresponding to a set of partially filtered macroblocks. An edge order controller in the de-blocking filter is configured to load the pixels corresponding to the set of sub-blocks into a filter engine from the internal pixel buffer, to filter the set of sub-blocks, such that, at least one horizontal edge is filtered before filtering all vertical edges of the set of sub-blocks.

Another embodiment provides a method for de-blocking filtering in a video processor. Pixels corresponding to a set of sub-blocks of a current macro-block of a video image to be filtered are loaded first. Then, partially filtered pixels corresponding to a set of partially filtered macroblocks and a set of filter parameters are loaded. The set of sub-blocks are then filtered, such that, at least one horizontal edge is filtered before filtering all vertical edges of the set of sub-blocks.

Another embodiment provides a method for de-blocking filtering in a video processor. Pixels corresponding to a set of sub-blocks of a current macro-block of a video image to be filtered are loaded first. Then, partially filtered pixels corresponding to a set of partially filtered macroblocks and a set of filter parameters are loaded. The set of sub-blocks are then filtered, such that at least one horizontal edge is filtered before filtering all vertical edges of the set of sub-blocks; the set of sub-blocks are processed from top to bottom of the macroblock, and such that a filtering order for each sub-block is the left vertical edge followed by the right vertical edge followed by the top horizontal edge and followed by the bottom horizontal edge; filtering any two edges of the sub-block is separated at least by one cycle of the de-blocking filter; and the vertical left edge and the vertical right edge of a bottom vertical sub-block is filtered before filtering a horizontal edge between two vertical sub-blocks of the set of sub-blocks.

Another embodiment provides a de-blocking filter in a video processor. The de-blocking filter includes a reconstructed memory that is configured to store reconstructed pixels corresponding to a current macroblock of a video image to be filtered. The current macroblock includes a set of sub-blocks, each sub-block having horizontal edges and vertical edges having a left vertical edge, a right vertical edge, a top horizontal edge and a bottom horizontal edge. The de-blocking filter further includes an internal pixel buffer configured to store pixels corresponding to the set of sub-blocks from the reconstructed memory, and to store partially filtered pixels corresponding to a set of partially filtered macroblocks. An edge order controller in the de-blocking filter is configured to load the pixels corresponding to the set of sub-blocks into a filter engine from the internal pixel buffer, to filter the set of sub-blocks, such that, at least one horizontal edge is filtered before filtering all vertical edges of the set of sub-blocks; a filtering order for each sub-block is the left vertical edge followed by the right vertical edge followed by the top horizontal edge and followed by the bottom horizontal edge, such that, the set of sub-blocks are processed from top to bottom of the current macroblock; filtering any two edges of the sub-block is separated at least by one cycle of the de-blocking filter; and the vertical left edge and the vertical right edge of a bottom vertical sub-block is filtered before filtering a horizontal edge between two vertical sub-blocks of the set of sub-blocks.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1A:
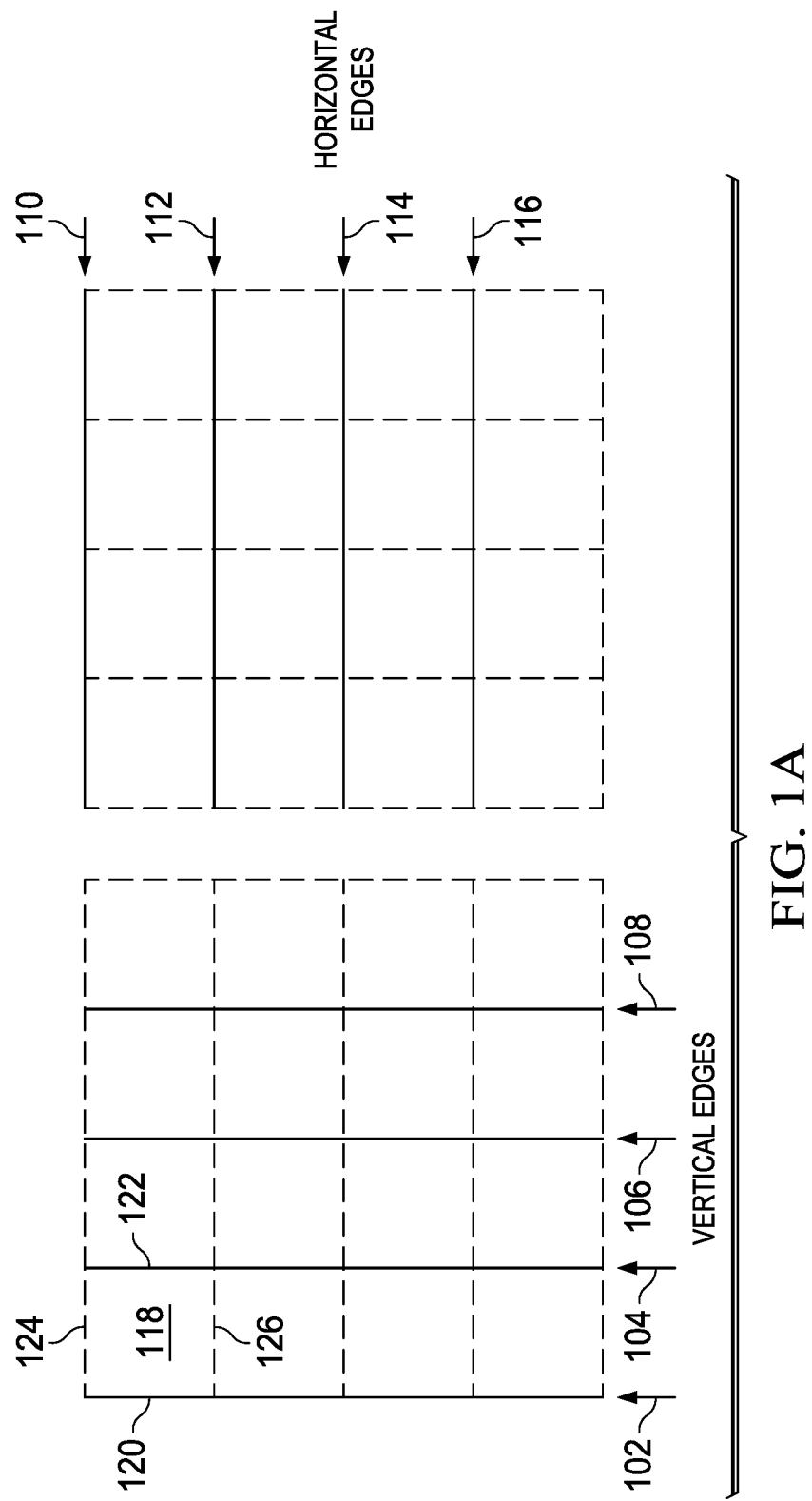
FIGS. 1a and 1b illustrate a standard edge order filter operation.
Figure 1B:
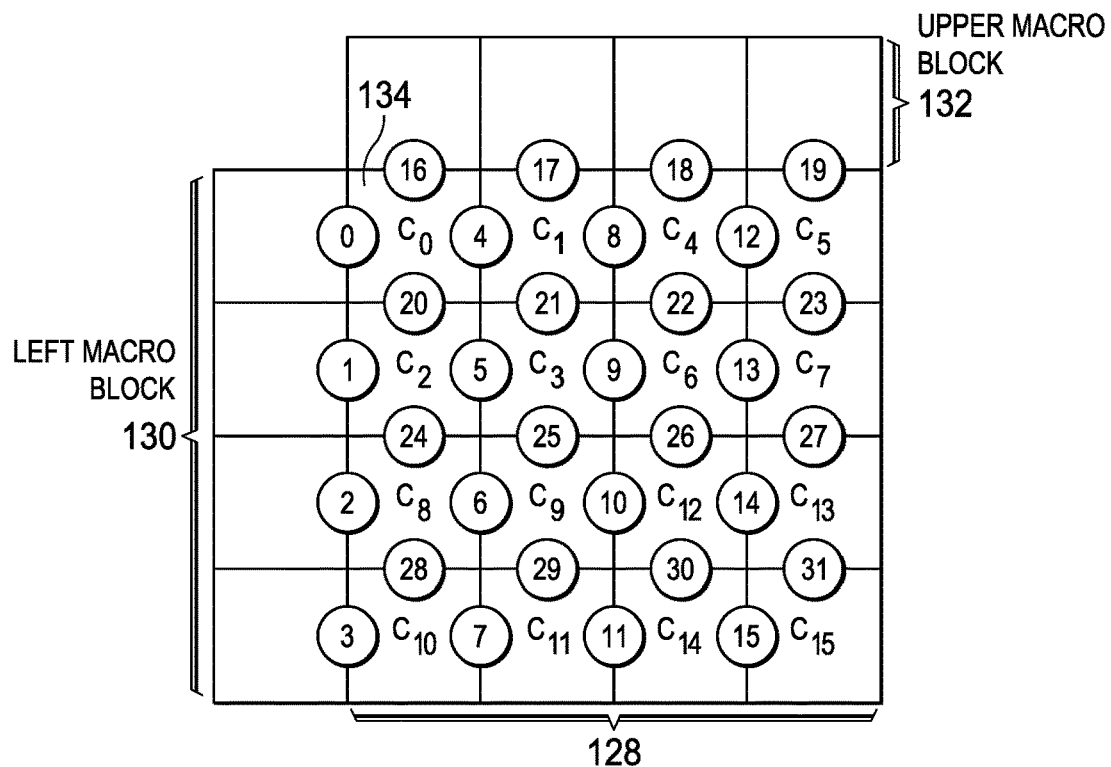

A de-blocking filter is used in video codecs, i.e. H.264 AVC/SVC, H.265, VC-1 etc., to improve subjective video quality and to enhance quality of bit stream encoding. FIGS. 1(a) and 1(b) illustrate a standard edge order de-blocking filter operation in H.264 video processing. Neighbor pixel aware adaptability of the de-blocking filter operation, loading of unfiltered/partially filtered pixels and storing of fully/partially filtered pixels for a given standard defined edge order of filter operation increases complexity of overall de-blocking filter for high performance video processing engine. To illustrate the complexity, a standard edge order filter operation is illustrated in FIG. 1a. A 16×16 macroblock is shown in FIG. 1a having a set of sub-blocks, for example sub-block 118. Each column of sub-blocks of the macroblock has vertical edges 102, 104, 106,108 and row of sub-blocks of macroblock has horizontal edges 110, 112, 114 and 116. For example sub-block 118 has a left vertical edge 120, a right vertical edge 122, a top horizontal edge 124 and a bottom horizontal edge 126.

The standard edge order filter operation, such as for H.264 standard defined edge order is defined as vertical edges 102, 104, 106, 108 from left to right followed by horizontal edges 110, 112, 114 and 116 from top to bottom as shown in FIG. 1a. Such a filter order is further illustrated in FIG. 1b. A 16×16 current macroblock 128 is illustrated along with a left macroblock 130 and upper macroblock 132. The numbers 0-31 shown on each edge of the sub-blocks indicate the corresponding cycle of the de-blocking filter.

There are generally five stages in a de-blocking filter operation. A set of parameters are loaded (for example filter parameters, control parameters, macroblock parameters etc.) followed by computing filter strength for each edge (called boundary strength). Then pixels corresponding to the current macroblock and partially filtered neighbor macroblocks are loaded. The current macroblock is filtered thereafter and pixels corresponding to partially filtered sub-blocks and fully filtered sub-blocks of the left macroblock, upper macroblock and current macroblock are stored. Loading, filtering and storing operations are repeated for luma (Y) and chroma (Cb and Cr). Standard defined order of filter operation of sub-block of the macroblock is as illustrated in FIG. 1b.

From the foregoing discussion, it is clear that pixels corresponding to a particular sub-block needs to be loaded and stored in a storage till all the four edges of that particular sub-block is filtered. In the example of FIG. 1b, pixels corresponding to the sub-block C0 need to be stored till $20^{th}$ cycle of the de-blocking filter because the bottom horizontal edge of sub-block C0 (134) is filtered only in $21^{st}$ cycle of the de-blocking filter. Further, pixels corresponding to the left macroblock 130 (right vertical edges of the sub-blocks of left macroblock) and upper macroblock 132 (bottom horizontal edges of the upper macroblock) also need to be loaded and stored while filtering the current macroblock 128. This increases the storage requirement in the architecture. For an edge filter order of FIG. 1b, pixels corresponding to the full 16×16 current macroblock needs to be stored during filtering. It can also be noted that the fully filtered pixels write is not properly staggered across full filter operation that leads to stalls in filter operation. Further, the reconstructed pixels corresponding to the current macroblock needs to be loaded sequentially. All 16 luma 4×4 blocks for the current macroblock needs to be loaded for consecutive 16 cycles. This leads to stall on loading pixels during filter operation. For a standard defined edge order filter operation as in FIG. 1b, the performance measurement for an un-pipelined de-blocking filter was estimated to take 632 cycles of the de-blocking filter for standard video processing architecture. Even after including other enhancement without optimizing efficient load/store from shared memories and filter operation, reaching better than 200 cycle is difficult. For a high performance de-blocking filter which helps in reaching 4K 60 fps or 4 channels of 1080P 60 fps performance, standard defined edge order invariably creates problem in pixel loading/storage and becomes bottleneck in creating efficient pipelined architecture.

Figure 2A:
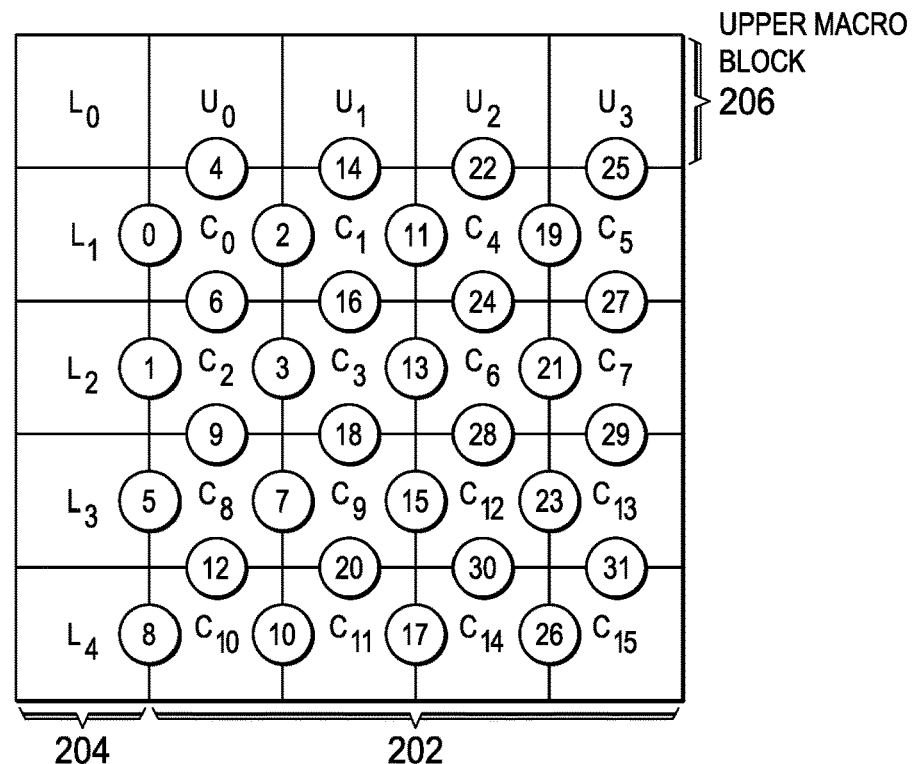
FIG. 2a illustrates a customized edge order filter operation according to an embodiment.
Figure 2B:
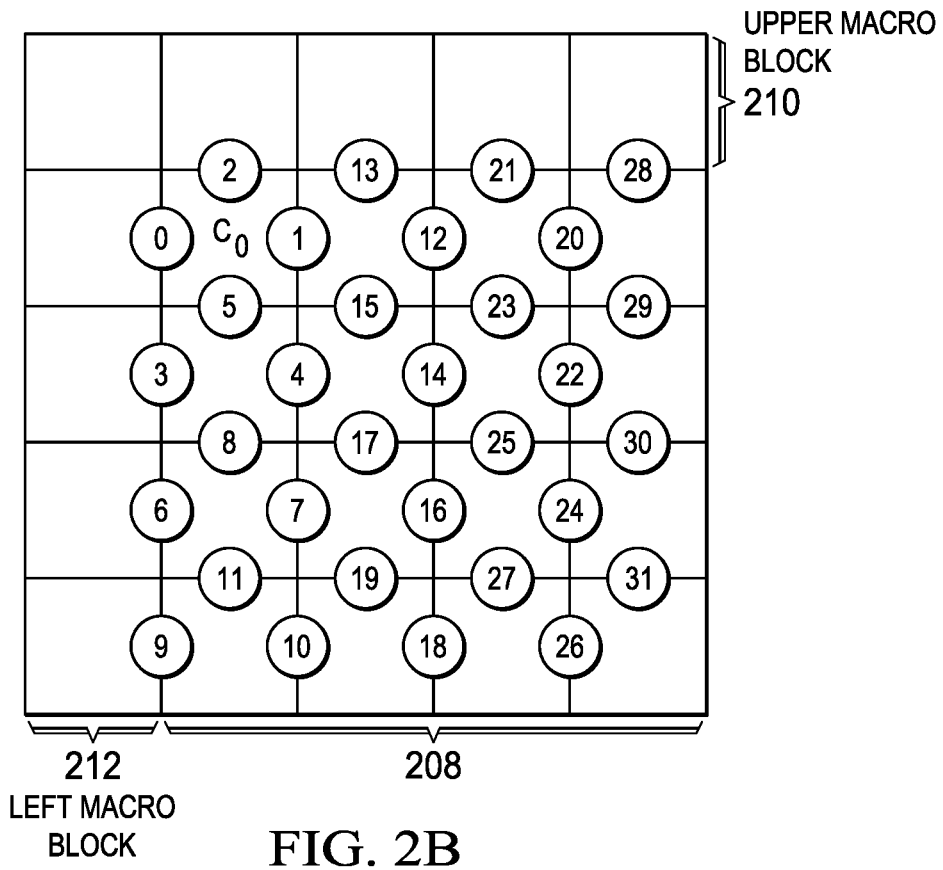
FIG. 2b illustrates a customized edge order filter operation according to another embodiment.

A customized edge order filter operation is illustrated in FIGS. 2a and 2b that overcomes the disadvantages associated with a standard defined edge order filter operation, according to an embodiment. The fundamental condition to the customized edge order filter operation is that at least one horizontal edge is filtered before filtering all vertical edges 102, 104, 106,108 of the set of sub-blocks. Another condition is that filtering of any two edges of the sub-block is separated at least by one cycle of the de-blocking filter. Customized edge order as in FIG. 2a is used when a same sub-block is available for its another edge filter operation after 2 cycles, whereas in FIG. 2b is used when same sub-block is available for its another edge filter operation after 1 cycle.

Referring now to FIG. 2a, a current macroblock 202, left macroblock 204 and upper macroblock 206 of a video image are illustrated. The indexes 0-31 shown on each edge of the set of sub-blocks (C0-C15) indicate the corresponding cycle of the de-blocking filter. Each sub-block is of 4×4 pixel size. The customized edge order filter operation according to one embodiment, is implemented such that any two edges of the sub-block, for example sub-block C0, is separated at least by two cycle of the de-blocking filter. It can be noted that the top horizontal edge and right vertical edge of the sub-block C0 is filtered at cycles 4 and 2 of the de-blocking filter respectively and are separated by two cycles. For the purpose of explaining the customized filter edge order of FIGS. 2a and 2b, it is considered that the first cycle count for the de-blocking filter starts from cycle 0, which is the left vertical edge of sub-block C0. It can also be noted that the sub-block C0 is fully filtered within 7 cycles of the de-blocking filter. The set of sub-blocks are processed from top to bottom of the current macroblock 202 according to this embodiment as illustrated in FIG. 2a. For example, the vertical neighboring sub-blocks C0, C2 and C8 are filtered within 7, 10 and 13 cycles of the de-blocking filter. A filtering order for each sub-block is the left vertical edge followed by the right vertical edge followed by the top horizontal edge and followed by the bottom horizontal edge, such that, the set of sub-blocks are processed from top to bottom of the current macroblock. It is also noted that the left vertical edge and the right vertical edge of a bottom vertical neighbor sub-block is filtered before filtering a horizontal edge between a current sub-block and the bottom vertical neighbor sub-block. Taking an example of sub-blocks C0 and C2, and considering C2 as the bottom vertical neighbor sub-block and C0 as the current sub-block, it can be seen that left vertical edge (in cycle 2) and the right vertical edge (in cycle 4) of a bottom vertical neighbor sub-block (C2) is filtered before filtering a horizontal edge (in cycle 7) between a current sub-block and the bottom vertical neighbor sub-block.

FIG. 2b illustrates another embodiment of customized edge order filter operation where any two edges of the sub-blocks are separated at least by one cycle of the de-blocking filter and a current macroblock 208, left macroblock 212 and upper macroblock 210 of a video image are illustrated. The indexes 0-31 shown on each edge of the set of sub-blocks (C0-C15) indicate the corresponding cycle of the de-blocking filter. Each sub-block is of 4×4 pixel size. The customized edge order filter operation according to one embodiment, is implemented such that any two edges of the sub-block, for example sub-block C0, is separated at least by one cycle of the de-blocking filter. It can be noted that the top horizontal edge and right vertical edge of the sub-block C0 is filtered at cycles 3 and 2 of the de-blocking filter respectively and are separated by one cycle. It can also be noted that the sub-block C0 is fully filtered within 6 cycles of the de-blocking filter. The set of sub-blocks are processed from top to bottom of the current macroblock 208 according to this embodiment as illustrated in FIG. 2b. For example, the sub-blocks C0, C2 and C8 are filtered, which are the vertical neighboring sub-blocks, within 6, 9 and 12 cycles of the de-blocking filter. A filtering order for each sub-block is the left vertical edge followed by the right vertical edge followed by the top horizontal edge and followed by the bottom horizontal edge, such that, the set of sub-blocks are processed from top to bottom of the current macroblock. It is also noted that the left vertical edge and the right vertical edge of a bottom vertical neighbor sub-block is filtered before filtering a horizontal edge between a current sub-block and the bottom vertical neighbor sub-block. Taking an example of sub-blocks C0 and C2, and considering C2 as the bottom vertical neighbor sub-block and C0 as the current sub-block, it is seen that left vertical edge (in cycle 4) and the right vertical edge (in cycle 5) of a bottom vertical neighbor sub-block (C2) is filtered before filtering a horizontal edge (in cycle 6) between a current sub-block and the bottom vertical neighbor sub-block.

Figure 3A:
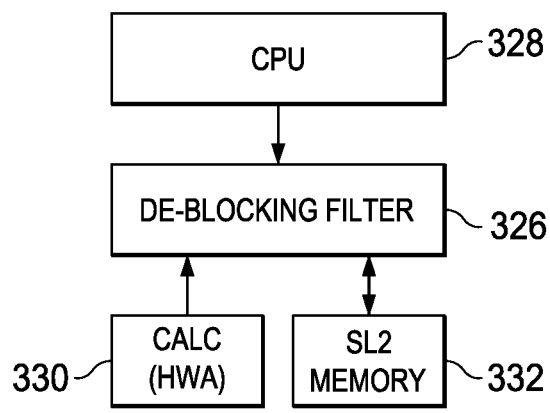
FIG. 3a is a block diagram of a deblocking filter in the video processor according to an embodiment.
Figure 3B:
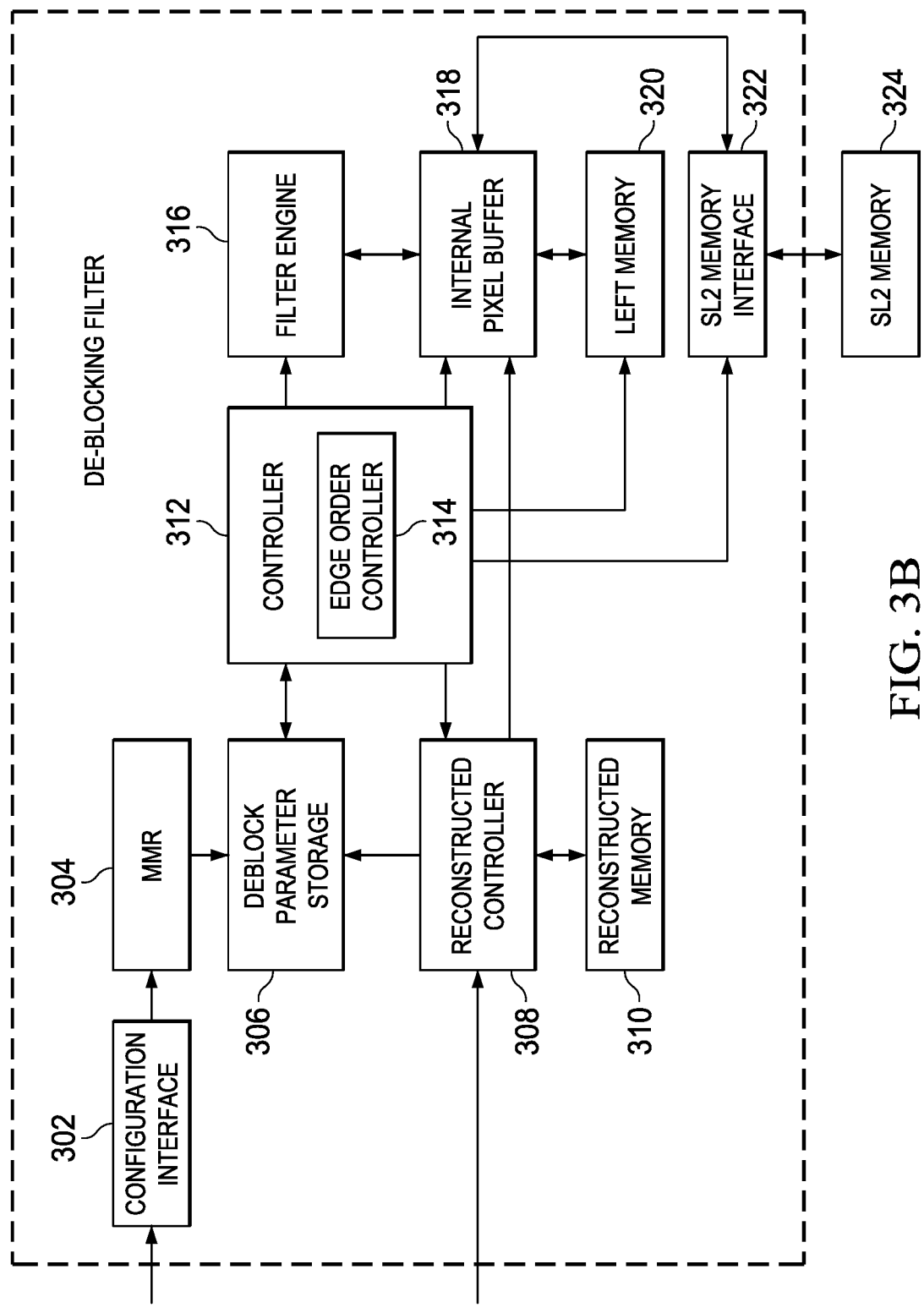
FIG. 3b is a block diagram of the deblocking filter according to an embodiment.

The effect of customized edge order filter operations of FIGS. 2a and 2b on the de-blocking filter architecture is explained using de-blocking filter integrated within video processor as shown in FIG. 3a and the de-blocking filter block diagram of FIG. 3b. The de-blocking filter of FIG. 3b is illustrated as a part of a video processing processor with other interfacing blocks as shown in FIG. 3a. The video processor may have other blocks which are not shown for the brevity of explanation.

The video processor includes various functional blocks for encoding and decoding of video data. The video processor configured to work as decoder, receives bit-stream for video decoding. An Entropy Decoder (ECD) (not shown in FIG. 3a) extracts motion vector information, macroblock coding parameters and quantized and transformed prediction error besides other encoded parameters useful for video decode. A Motion Compensation (MC) block (not shown in FIG. 3a) loads set of blocks from reference frame as required by motion vector and prediction information received by ECD. MC block creates predicted macroblock for further processing by quantization and transformation block (CALC) 330. The CALC 330 inverse quantize and inverse transform received prediction error and recreate macroblock after adding with predicted MB generated by MC. This recreated pixels of macroblock, called reconstructed pixels, is filtered by de-blocking filter 326 to eliminate blocking artifacts. Fully filtered decoded frame is stored back into external memory (not shown in FIG. 3a) for display or any post processing operation.

Video processor configured to work as encoder, receives video frame from either camera source or external storage with set of video frame data. Received frame is processed in unit of macroblock. Intra prediction block and Motion Estimation Engine (MEE) (not shown in FIG. 3a) estimates best prediction type of received macroblock and generates predicted motion vector if prediction type is inter macroblock. The intra prediction block and motion estimation engine creates a predicted MB, if inter-MB, based on received motion vector. CALC 330 generates prediction error based on predicted and received MB and pass on prediction error to entropy coder (ECD) after transformation and quantization. The ECD generates encoded bit-stream after entropy coding of received data from CALC along with encoding of motion vector prediction error and other relevant prediction and coding parameters. CALC 330 already having predicted MB also does reverse quantization and reverse transformation on prediction error, as it does in the decoder, to recreate reconstructed pixel like on generated bit stream. Reconstructed pixel is filtered by de-blocking filter 326 to eliminate blocking artifacts. Fully filtered decoded frame is stored back into external memory (not shown in FIG. 3a) to be used as reference for next frame encoding.

Video processor operable as encoding or decoding engine has common de-blocking filter block 326 as in FIG. 3a. Central processing unit (CPU) 328 provides operable parameters to de-blocking block 326 through configuration interface. These parameters includes, but not limited to, enabling the de-blocking operation and various address pointers of pixel and parameter buffer in shared memory (SL2 memory) 332. Reconstructed pixels to de-block filtered is generated by quantization and transformation block (CALC) 330. CALC 330 generates reconstructed pixels and pass onto de-blocking filter 326. De-blocking filter 326 receives configuration parameters from CPU 328, reconstructed pixels and available de-blocking and MB/slice parameter from CALC 330 and rest other parameters from SL2 memory 332 not available inside CALC 330. De-blocking filter 326 also receives partially filtered pixels of upper macroblock from SL2 memory 332 and store back fully filtered current macroblock and partially filtered bottom pixels in SL2 memory 332. In another embodiment CALC 330 writes reconstructed pixels and available de-blocking and MB/slice parameters into shared memory 330 and de-blocking filter 326 loads them as required during filter operation.

FIG. 3b illustrates the de-blocking filter (326) operable to eliminate blocking artifacts due to block based video processing. The de-blocking filter includes a configuration interface 302 connected to a Memory Mapped Register (MMR) 304. The configuration interface 302 is MMR configuration interface connected directly or through interconnect to CPU or anything similar to an initiator capable of accessing the MMR 304. The MMR 304 is required to store configured control parameters for the filter operation. The MMR 304 includes all information regarding pre-filter data loading parameters as well as post filter data storage parameters. An output of the MMR 304 is connected to de-block parameter storage 306. The de-block parameter storage 306 is configured to store control parameters for filtering the current macroblock. This includes runtime parameters as well as configured parameters through the configuration interface 302 and passed on to the MMR 304. A set of runtime macroblock/slice level parameters are also loaded by a controller 312 from a shared memory (SL2 memory) 324 and stored into the de-block parameter storage 306. In another embodiment the macroblock/slice level parameters are passed on by previous stage CALC HWA along with reconstructed pixels. A reconstructed controller 308 loads these parameters from reconstructed memory 310 and store into de-block parameter storage 306 after starting filter operation.

The reconstructed controller 308 is configured to control writing of reconstructed pixels along with macroblock/slice level parameters into the reconstructed memory 310. The reconstructed controller 308 also informs the controller 312 about availability of reconstructed pixels. After the controller 312 starts the filter operation, the reconstructed controller 308 loads parameters from reconstructed memory 310 and stores into de-block parameter storage 306. The reconstructed controller 308 is also controlled by edge order controller 314 as part of controller 312 to load reconstructed pixels from the reconstructed memory 310 and store into an internal pixel buffer 318. The reconstructed memory 310 is configured to store reconstructed pixels corresponding to the current macroblock of the video image to be filtered.

An edge order controller 314 in a controller 312 is coupled to the de-block parameter storage 306, the reconstructed controller 308, an SL2 memory 324 via SL2 memory interface 322 and a left memory 320 to manage sequencing of data load from these as per their requirement in filter operation. The controller 312 controls starting the de-blocking filter operation, sequencing luma(Y) and chroma (Cb and Cr) filter operation and indicating end of filter operation. An edge order controller 314 manages order of the filter operation as per customized edge order, managing loading of various partially/non-filtered pixels from the reconstructed memory 310, the SL2 memory 324 and the left memory 320. The edge order controller 314 being part of controller 312 is connected to a filter engine 316. The filter engine 316 applies filter operation on every filterable edge of both luma and chroma components. Filter engine has 4 independent H.264 filter blocks and operates on all 4-pixel sets of 4×4 sub-blocks in parallel. Filtering is performed based on computed boundary strength (BS) for each edge and on other slice/macroblock parameters (disable_deblocking_filter_idc, picture/frame boundary, slice boundary etc.). In another embodiment, controller 312 contains all the functionality of edge order controller 314. Its connectivity with rest of blocks remains same.

The filter engine 316 is connected to an internal pixel buffer 318. The internal pixel buffer 318 is configured to store pixels corresponding to the set of sub-blocks from the reconstructed memory 310, and to store partially filtered pixels corresponding to a set of partially filtered macroblocks. The internal pixel buffer 318 stores pre-filter 4×4 pixel data and runtime partially filtered data. Data is sourced from reconstructed memory 310, the SL2 memory 324 and the left memory 320 and eventually stored back into the SL2 memory 324 and the left memory 320. In another embodiment, the left memory 320 or any other internal storage can be extended to store all post processed pixels (filter/partially filtered). In another embodiment content of reconstructed memory can be written by CALC in SL2 memory 324 and loaded by edge order controller 314 through SL2 memory interface 322.

Generally, the requirement in the de-blocking filter operation is to minimize storage and stay of pixels in internal pixel buffer 318 corresponding to sub-blocks such that filter engines (in case of a 4×4 sub-block) are never stalled due to lack of Internal Pixel Buffer storage (IPB) 318. All load and store operation happens in background except at the beginning and end of the filter operation. Also resultant filtered data must be bit-exact to standard defined edge order filter operation. Customized edge order illustrated in FIGS. 2*a* and 2*b*, according to an embodiment overcomes storage and performance bottleneck of standard edge order filter operation.

H.264 filter operation has two parts. First part, called a pre-filter operation, is computation of $\alpha$ $\beta$ and $tc_0$ and second part is Boundary Strength (BS) dependent filter operation. Sequencing both operations in single cycle timing path for 266 MHz de-blocking filter engine is timing critical. Filter engine 316 filters sub-blocks loaded from internal pixel buffer 318 and stores back processed sub-block into internal pixel buffer 318. One pipeline stage has been added in filter operation, after pre-filter stage, to eliminate timing pressure on path between filter engine 316 and internal pixel buffer 318. This creates problem for edge order selection, as same 4×4 sub-blocks is not required for filter operation back-to-back. Either it will create bubble/idle-cycle inside filter operation or filter output will be required to be fed through into pre-filter pipeline stage. Both design constraints are avoidable if minimum 2-cycle gap is assumed between edges of same 4×4 blocks such as the one illustrated in FIG. 2*a*.

In another embodiment, pre-filter operation and filter operation can be completed in single cycle. Operation includes loading sub-blocks from internal pixel buffer 318, filter operation and store back filtered sub-blocks in internal pixel buffer 318. This eliminates need of two cycle gap. With one cycle gap between two edges of sub-block, the customized edge order is as illustrated in FIG. 2*b*.

The left memory 320 is configured to store pixels corresponding to a partially filtered left macroblock of the set of partially filtered macroblocks. This includes partially filtered right 4×4 block column of luma, Cb and Cr to be used in next macroblock filtering (filter candidate macroblock is always in faster scan order). The left memory 320 also serves as temporary storage, for example, MBAFF (macroblock adaptive frame or filed coding) frame pair upper macroblock bottom row storage, fully filtered current macroblock Cb components before interleaving with Cr components for writing in NV12 format output.

Shared Memory (SL2) interface unit 322, coupled to the controller 312, SL2 memory 324 and the internal pixel buffer 318, is configured to load partially filtered pixels and required macroblock/slice parameters from the SL2 memory 324. The SL2 memory 324 is configured to store pixels corresponding to a partially filtered upper macroblock of the set of partially filtered macroblocks and a set of parameters corresponding to the partially filtered upper macroblock. The SL2 memory interface 322 also assists in writing fully filtered pixels and partially filter bottom row into the SL2 memory 324. The SL2 memory interface also loads Cb from the left memory 320 prior to Cb and Cr interleaving and eventually writing into fully filtered chroma buffer in SL2 memory 324. In another embodiment SL2 memory interface 322 also helps in loading reconstructed pixels and all MB/slice parameters from SL2 memory 324.

Shared memory (SL2) 324 is shared by all HWAs of the video processor. Its access interface is stallable for de-blocking filter. System performance has shown that probability of stalling each SL2 memory 324 access is 20%. Said differently, one access out of 5 accesses can be stalled. The customized edge order filtering, according to several embodiments, need 40 SL2 access for loading and storing pixels. Evenly distributed accesses have more chance of absorbing stall than back-to-back access. With customized edge order of FIGS. 2a and 2b, SL2 writes are well sparse throughout filter operation window and makes the design more robust against SL2 stall. In another embodiment SL2 memory 324 can be used for storing and loading all data required for de-blocking filter operation.

The filter engine 316 is controlled by the edge order controller 314 to filter the set of sub-blocks based on several conditions as explained below. One condition, according to an embodiment is that, at least one horizontal edge is filtered before filtering all vertical edges of the set of sub-blocks. Second condition is that a filtering order for each sub-block is the left vertical edge followed by the right vertical edge followed by the top horizontal edge and followed by the bottom horizontal edge, such that, the set of sub-blocks are processed from top to bottom of the current macroblock (202 or 208). Third condition is that filtering any two edges of the sub-block is separated at least by one cycle of the de-blocking filter. Examples of any two edges of the sub-block being separated at least by two cycles and at least by one cycle of the de-blocking filter are illustrated in FIGS. 2a and 2b. Fourth condition is that the vertical left edge and the vertical right edge of a bottom vertical sub-block is filtered before filtering a horizontal edge between two vertical sub-blocks of the set of sub-blocks.

It is noted that the pattern of output data of the de-blocking filter, in case of interlaced picture is key concern for a de-block architecture. In case of MBAFF frame-pair and interlaced frame (PiCFF) mb, even and odd fields are may be required to be stored into separate filter buffers in the SL2 memory 324. Two vertical neighbors 4×4 blocks are paired to generate separate even and odd 4×4 blocks in one embodiment. This is possible only if the order of generation of processed pixels is from top to bottom. For any other order of output pixel generation, temporary storage required for pairing will increase. For the customized edge order filter, two different pairing storage on SL2 memory interface 322 is sufficient to meet performance. Standard defined edge order will require minimum 4 such pairing storage, as order of generated filtered pixels are from left to right (except the first 4×16 column).

Customized edge order as illustrated in FIGS. 2a and 2b is for luma component of macroblock. Chroma component in 4:2:0 is of size 8×8 and slight modification is required in edge order. Referring to FIG. 2a, 2-cycle gap required customized edge order for chroma will be 0, 1, 2, 3, 4, 14, 6 and 16. Similarly referring FIG. 2b, 1-cycle gap required customized edge order for chroma will be 0, 2, 4, 1, 3, 6, 14 and 16. Numbering as explained above is cycle number associated with edge in customized edge order for luma.

Figure 4:
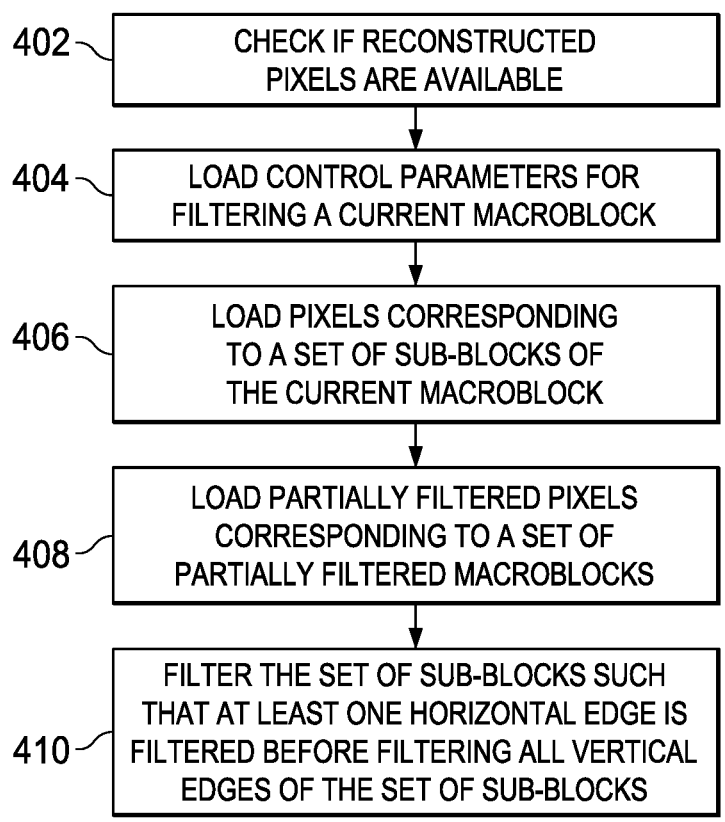
FIG. 4 is a flowchart illustrating the customized filter order operation according to an embodiment.

Operation of the de-blocking filter in FIG. 3b is illustrated using the flowchart of FIG. 4 according to an embodiment.

At step 402 the availability of reconstructed pixels is checked. The Controller 312 is informed by the reconstructed controller 308, when all reconstructed sub-blocks of macroblock is available in reconstructed memory 310. At step 404, a set of control parameters for filtering a current macroblock are loaded. De-block parameters are written along with reconstructed pixels in the reconstructed memory 310. Reconstructed controller 308 loads these parameters, such as coding type, slice type, quantization parameter etc into de-block parameter storage 306. Controller loads some remaining parameters from shared memory 324 and stores into de-block parameter storage 306.

At step 406, pixels corresponding to a set of sub-blocks of the current macroblock are loaded. Reconstructed pixels are loaded into internal pixel buffer in a pre-defined order to be required for filter operation as per customized edge order.

At step 408, partially filtered pixels corresponding to a set of partially filtered macroblocks are loaded. There are three different kinds of data required in the filter operation. Reconstructed pixels stored in reconstructed memory, partially filtered pixels of left macroblock stored in left memory 320 and of upper macroblock stored in SL2 memory 324. Customized edge order needs fixed order of sub-block loading from all three sources. This order can change for a change in edge order. Edge order controller 314 ensures to load required sub-blocks from sources into internal pixel buffer. It also handles conflict of sub-blocks from different sources slated for storage into same internal pixel buffer entry. Edge order controller 314 controls loading the pair of sub-blocks into filter engine 316 as per customized edge order.

At step 410, the set of sub-blocks are filtered such that at least one horizontal edge is filtered before filtering all vertical edges of the set of sub-blocks. After filter operation processed sub-blocks are stored back into internal pixel buffer. After all filterable edges of a sub-block are filtered and stored back into either left memory (partially filtered pixel for partially filtered left macroblock) or into SL2 memory (fully filtered pixels and partially filtered pixels for partially filtered upper macroblock).

Step 406, 408 and 410 is repeated till all sub-blocks of macroblock are fully processed. In another embodiment, step 406, 408 and 410 operates in parallel till all sub-blocks of macroblock is fully processed from de-blocking filter. Various embodiments of the present disclosure are implemented in video codecs such as H.264, H.265 (HEVC), and VC-1. As per various embodiments IPB area is reduced by ~38% for one such implementation for H.264. The IPB only needs to have storage for 10 4×4 blocks. This also leads to savings in power reduction as smaller IPB leads to smaller mux sizes around IPB. Current MUX logic is 10:2 (128b mux) Vs 25:2 (128b mux). Further, staggered loading of partially filtered top row pixels, helps in absorbing SL2 memory access stalls. Reconstructed memory loading stall can be better absorbed, as next reconstructed pixel sub-block is not required back to back. Staggered write of processed 4×4 blocks into SL2 memory make it more stall tolerant. All combined above helps in achieving 100 cycle de-blocking filter requirement with lower area and lower power for 1080 240 fps H.264 decode/encode enabler.

Figure 5:
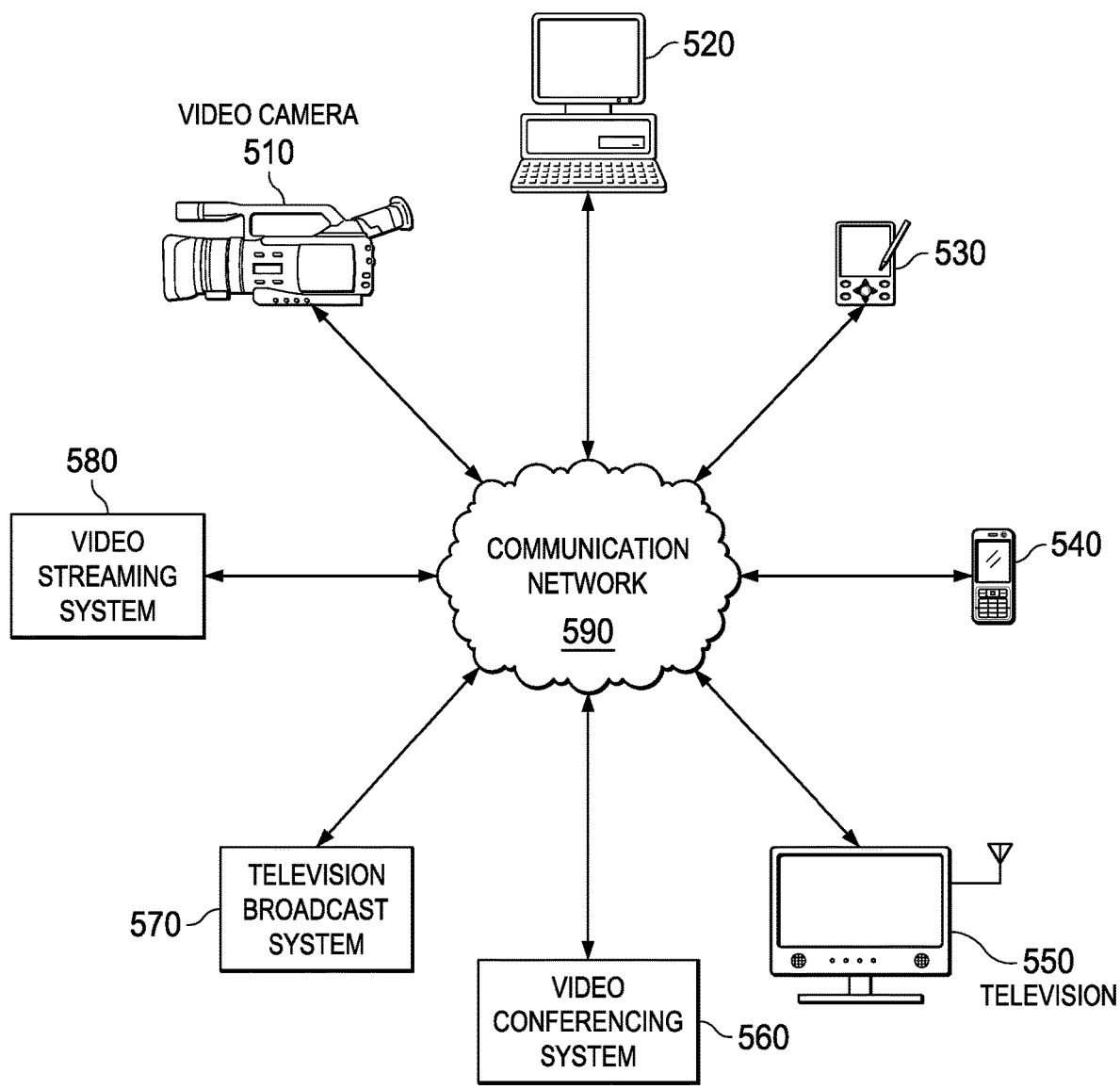
FIG. 5 is an example environment in which various aspect of the present disclosure can be implemented.

FIG. 5 is an example environment in which various aspect of the present disclosure may be implemented. As shown, the environment may comprise, for example, one or more video cameras 510, computers 520, Personal Digital Assistants (PDA) 530, mobile devices 540, televisions 550, video conference systems 560, video streaming systems 580, TV broadcasting systems 570 and communication networks/channels 590.

The video cameras 510 are configured to take continuous pictures and generate digital video signal comprising sequence of image frames. The video cameras 510 are configured to process the image frames for efficient storage and/or for transmission over the communication network 590. The computers 520, PDAs 530 and the mobile devices 540 are configured to encode the video signals for transmission and to decode encoded video signals received from the communication networks/channels 590. The video streaming system 580 is configured to encode video signal and to transmit the encoded video signals over the communication networks/channels 590 responsive to a received request and/or asynchronously. The television broadcast systems 570 are configured to process video signals in accordance with one or more broadcast technologies and to broadcast the processed video signals over the communication networks/channels 590. The video conference systems 160 are configured to receive a video signal from one or more participating/conferencing end-terminals (not shown) and to convert or compress the video signal for broadcasting or for transmitting to other participating user terminals. The televisions 550 are configured to receive encoded video signals from one or more different broadcasting centers (or channels), to decode each video signal and to display the decoded video signals on a display device (not shown).

As shown in FIG. 5, the devices and systems 510-580 are coupled to communication networks/channels 590. Communication networks/channels 190 supports an exchange of video signal encoded in accordance with one or more video encoding standards such as, but not limited to, H.263, H.264/AVC, and HEVC (H.265), for example. Accordingly, the devices and systems 510-580 are process (encode and/or decode) video signals complying with such standards. The systems and devices 510-580 are implemented with one or more functional units that are configured to perform signal processing, transmitting and/or receiving of video signals from communication networks/channels 590.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

The invention claimed is:

1. An apparatus comprising:
a memory configured to store reconstructed pixels corresponding to a macroblock,
wherein the macroblock includes a first sub-block including a first left vertical edge, a first right vertical edge, a first top horizontal edge, and a first bottom horizontal edge,
wherein the macroblock further includes a second sub-block including a second left vertical edge, a second right vertical edge, a second top horizontal edge, and a second bottom horizontal edge, and
wherein the first right vertical edge and the second left vertical edge are a boundary between the first and second sub-blocks; and
a filter controller configured to:
filter the first top horizontal edge;
after filtering the first top horizontal edge, filter the first bottom horizontal edge; and
after filtering the first bottom horizontal edge, filter the second top horizontal edge.

2. The apparatus of claim 1,
wherein the macroblock further includes a third sub-block including a third left vertical edge, a third right vertical edge, a third top horizontal edge, and a third bottom horizontal edge,
wherein the first bottom horizontal edge and the third top horizontal edge are a boundary between the first and third sub-blocks, and
wherein the filter controller is further configured to filter the third left vertical edge before filtering the first top horizontal edge.

3. The apparatus of claim 2, wherein the filter controller is configured to:
filter the first right vertical edge after filtering the third left vertical edge; and
filter the first top horizontal edge after filtering the first right vertical edge.

4. The apparatus of claim 3, wherein the filter controller is configured to:
filter the third right vertical edge after filtering the first right vertical edge; and
filter the first top horizontal edge after filtering the third right vertical edge.

5. The apparatus of claim 1, wherein the filter controller is further configured to filter the first right vertical edge before filtering the first top horizontal edge.

6. The apparatus of claim 5,
wherein the macroblock further includes a third sub-block including a third left vertical edge, a third right vertical edge, a third top horizontal edge, and a third bottom horizontal edge,
wherein the first bottom horizontal edge and the third top horizontal edge are a boundary between the first and third sub-blocks, and
wherein the filter controller is further configured to filter the third left vertical edge after filtering the first top horizontal edge.

7. The apparatus of claim 6, wherein the filter controller is further configured to filter the third right vertical edge after filtering the third left vertical edge.

8. The apparatus of claim 7, wherein the filter controller is configured to filter the first bottom horizontal edge after filtering the third right vertical edge and before filtering the second right vertical edge.

9. The apparatus of claim 1, wherein the filter controller is further configured to filter the second right vertical edge before filtering the second top horizontal edge.

10. An apparatus comprising:
a memory configured to store reconstructed pixels corresponding to a macroblock,
wherein the macroblock includes a first sub-block including a first left vertical edge, a first right vertical edge, a first top horizontal edge, and a first bottom horizontal edge,
wherein the macroblock further includes a second sub-block including a second left vertical edge, a second right vertical edge, a second top horizontal edge, and a second bottom horizontal edge, and
wherein the first bottom horizontal edge and the second top horizontal edge are a boundary between the first and second sub-blocks; and
a filter controller configured to:
filter the first right vertical edge;
after filtering the first right vertical edge, filter the second left vertical edge; and
after filtering the second left vertical edge, filter the second right vertical edge.

11. The apparatus of claim 10, wherein the filter controller is further configured to filter the first top horizontal edge after filtering the first right vertical edge and before filtering the second left vertical edge.

12. The apparatus of claim 10, wherein the filter controller is further configured to filter the first top horizontal edge after filtering the second left vertical edge and before filtering the second right vertical edge.

13. A method comprising:
loading pixels corresponding to a first sub-block and a second sub-block of a macroblock,
  wherein the macroblock includes a first sub-block including a first left vertical edge, a first right vertical edge, a first top horizontal edge, and a first bottom horizontal edge,
  wherein the macroblock further includes a second sub-block including a second left vertical edge, a second right vertical edge, a second top horizontal edge, and a second bottom horizontal edge, and
  wherein the first right vertical edge and the second left vertical edge are a boundary between the first and second sub-blocks;
filtering the first top horizontal edge;
after filtering the first top horizontal edge, filtering the first bottom horizontal edge; and
after filtering the first bottom horizontal edge, filtering the second top horizontal edge.

14. The method of claim 13,
wherein the macroblock further includes a third sub-block including a third left vertical edge, a third right vertical edge, a third top horizontal edge, and a third bottom horizontal edge,
wherein the first bottom horizontal edge and the third top horizontal edge are a boundary between the first and third sub-blocks, and
wherein the method further comprises filtering the third left vertical edge before filtering the first top horizontal edge.

15. The method of claim 14, further comprising:
filtering the first right vertical edge after filtering the third left vertical edge; and
filtering the first top horizontal edge after filtering the first right vertical edge.

16. The method of claim 15, further comprising:
filtering the third right vertical edge after filtering the first right vertical edge; and
filtering the first top horizontal edge after filtering the third right vertical edge.

17. The method of claim 13, further comprising filtering the first right vertical edge before filtering the first top horizontal edge.

18. The method of claim 17,
wherein the macroblock further includes a third sub-block including a third left vertical edge, a third right vertical edge, a third top horizontal edge, and a third bottom horizontal edge,
wherein the first bottom horizontal edge and the third top horizontal edge are a boundary between the first and third sub-blocks, and
wherein the method further comprises filtering the third left vertical edge after filtering the first top horizontal edge.

19. The method of claim 18, further comprising filtering the third right vertical edge after filtering the third left vertical edge,
wherein filtering the first bottom horizontal edge occurs after filtering the third right vertical edge and before filtering the second right vertical edge.

20. The method of claim 13, further comprising filtering the second right vertical edge before filtering the second top horizontal edge.

* * * * *